(12) United States Patent
Aoki

(10) Patent No.: US 6,406,793 B1
(45) Date of Patent: Jun. 18, 2002

(54) ADDITION-REACTION SILICONE PRESSURE SENSITIVE ADHESIVE COMPOSITION

(75) Inventor: Shunji Aoki, Gunma-ken (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

(21) Appl. No.: 09/667,557

(22) Filed: Sep. 22, 2000

(30) Foreign Application Priority Data

Sep. 22, 1999 (JP) .......................... 11-268603

(51) Int. Cl.⁷ .............................. B32B 25/08
(52) U.S. Cl. .................. 428/447; 528/15; 528/20; 525/477; 525/478; 556/451; 568/873
(58) Field of Search ...................... 528/15, 20; 525/477, 525/478; 556/451; 568/873; 428/447

(56) References Cited

U.S. PATENT DOCUMENTS 6,124,407 A * 9/2000 Lee et al.
6,127,503 A * 10/2000 Fujioka et al.
6,201,055 B1 * 3/2001 Lutz et al.

FOREIGN PATENT DOCUMENTS

JP 11-166122 * 6/1999

* cited by examiner

Primary Examiner—Robert Dawson
Assistant Examiner—Kuo-Liang Peng
(74) Attorney, Agent, or Firm—Millen, White, Zelano & Branigan, P.C.

(57) ABSTRACT

A silicone pressure sensitive adhesive composition utilizing addition reaction between alkenyl groups of alkenyl group-containing diorganopolysiloxanes and SiH groups of organohydrogenpolysiloxanes, which comprises (A) diorganopolysiloxanes containing alkenyl groups the number of which is on average at least two a molecule, (B) an organopolysiloxane comprising $R^2_3SiO_{C.5}$ units, wherein $R^2$ is an unsubstituted or substituted 1–10C monovalent hydrocarbon group, and $SiO_2$ units in a $R^2_3SiO_{C.5}/SiO_2$ ratio of from 0.6 to 1.3 by mole, (C) an organohydrogenpolysiloxane containing at least two per molecule of silicon-bonded hydrogen atoms, (D) an acetylene alcohol compound represented by the following formula

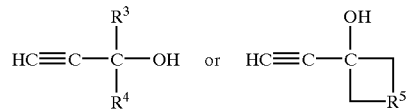

wherein $R^3$ and $R^4$ are each a monovalent 1–8C hydrocarbon group and $R^5$ is a divalent 3–8C hydrocarbon group, (E) a silylated acetylene alcohol compound represented by the following formula

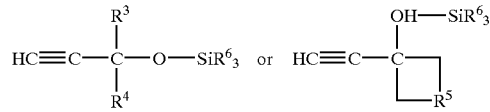

wherein $R^3$, $R^4$ and $R^6$ are each a monovalent 1–8C hydrocarbon group and $R^5$ is a divalent 3–8C hydrocarbon group, and (F) a platinum catalyst.

16 Claims, No Drawings

ADDITION-REACTION SILICONE PRESSURE SENSITIVE ADHESIVE COMPOSITION

FIELD OF THE INVENTION

The present invention relates to a silicone pressure sensitive adhesive composition of addition reaction type and, more particularly, to an addition-reaction silicone pressure sensitive adhesive composition that can inhibit curing reaction from occurring in a treatment bath (which is prepared by dissolving the composition in an appropriate solvent) before the bath is used actually for treatment, and thereby can have improved working capability.

BACKGROUND OF THE INVENTION

Silicone pressure sensitive adhesives are highly resistant to heat, cold, weather and chemicals, and further have excellent electrical insulation capability. Therefore, they are used under such a severe condition that both acrylic and rubber pressure sensitive adhesives suffer deterioration to be rendered useless. As curing reactions caused in those silicone pressure sensitive adhesives, there are known the peroxide cross-linking reactions utilizing organic peroxides as catalysts and the cross-linking reaction utilizing the addition reaction occurring between SiH and alkenyl groups in the presence of platinum catalysts (Japanese Tokko Sho 54-37907, wherein the term "Tokko" means an "examined patent publication").

The silicone pressure sensitive adhesives of the type which form cross-links by addition reaction (which are referred to as "addition-reaction silicone pressure sensitive adhesives") have excellent low-temperature curability, and so require no high temperatures for curing. Consequently, the application of such pressure sensitive adhesives to substrates inferior in heat resistance has been carried forward.

However, the addition reaction is gradually progressing and the SiH groups of cross-linking agents are decreased by consumption even in the state of a treatment bath before application to substrates. Therefore, not only properties of pressure sensitive adhesive change but also the treatment bath causes an increase in viscosity or gelation with a lapse of time in some cases or the pressure sensitive adhesives reduce or lose their curability in other cases. Therefore, the usable term of the treatment bath is limited. In a particular case where a temperature rise is caused by stirring the treatment bath, there occurs a problem that the usable term is further shortened.

SUMMARY OF THE INVENTION

Therefore, an object of the invention is to provide an addition-reaction silicone pressure sensitive adhesive composition which hardly causes a viscosity increase or gelation but also inhibits a cross-linking agent from losing SiH groups and hardly suffer deterioration of tackiness characteristics even when many hours are passed in the state of a treatment bath prepared by dissolving the composition in an appropriate solvent before application to substrates.

The aforementioned object is attained with an addition-reaction silicone pressure sensitive adhesive composition comprising (A) diorganopolysiloxanes containing alkenyl groups the number of which is on average at least two a molecule, (B) an organopolysiloxane comprising $R^2{}_3SiO_{C.5}$ units (wherein $R^2$ is an unsubstituted or substituted monovalent hydrocarbon group containing 1 to 10 carbon atoms) and $SiO_2$ units in a $R^2{}_3SiO_{C.5}/SiO_2$ ratio of from 0.6 to 1.3 by mole, (C) an organohydrogenpolysiloxane containing at least two per molecule of silicon-bonded hydrogen atoms, (D) an acetylene alcohol compound represented by the following formula,

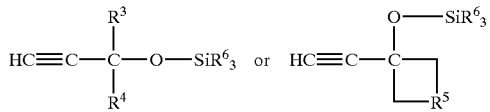

wherein $R^3$ and $R^4$ are each a monovalent hydrocarbon group containing 1 to 8 carbon atoms and $R^5$ is a divalent hydrocarbon group containing 3 to 8 carbon atoms, (E) a silylated acetylene alcohol compound represented by the following formula,

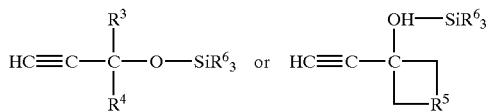

wherein $R^3$, $R^4$ and $R^6$ are each a monovalent hydrocarbon group containing 1 to 8 carbon atoms and $R^5$ is a divalent hydrocarbon group containing 3 to 8 carbon atoms, and (F) a platinum catalyst.

DETAILED DESCRIPTION OF THE INVENTION

The component (A) is constituted of diorganopolysiloxanes containing alkenyl groups the number of which is on average at least two a molecule, and they are preferably represented by the formula $R^1{}_aR_{(3-a)}SiO$—$(R^1RSiO)_m$—$(R^2SiO)_n$—$SiR^1{}_aR_{(3-a)}$.

In the above formula, $R^1$ is an alkenyl group represented by —$C_iH_{2i}$—CH=$CH_2$ (i=0 to 8); R groups, which may be the same or different, are each a substituted or unsubstituted 1–10C hydrocarbon group other than an alkenyl group; a is from 0 to 3 and m is a number of 0 or above, provided that the case of a=m=0 is excluded therefrom and the relation 2a+m≧2 is satisfied; and n is a number of at least 10.

Examples of R include alkyl groups such as methyl, ethyl, propyl and butyl groups, cycloalkyl groups such as cyclohexyl group, aryl groups such as phenyl and tolyl groups, and groups prepared by substituting hydroxy group(s), cyano group(s) or halogen atom(s) for a part or all of carbon-bonded hydrogen atoms in the groups as recited above, such as hydroxypropyl, cyanoethyl, 1-chloropropyl and 3,3,3-trifluoropropyl groups. Of these groups, methyl and phenyl groups are preferred in particular as R groups. Further, it is advantageous to the invention that at least 50% of all the R groups be methyl groups.

Examples of $R^1$ include vinyl, allyl, butenyl and hexenyl groups. In particular, vinyl group is preferred over the others. And a is preferably 1.

The diorganopolysiloxanes containing alkenyl groups as mentioned above may have a straight-chain structure or a branched structure. And they may be in a state of oil or gum. When they are in the state of oil, the suitable viscosity thereof is at least 50 cS at 25° C. However, it is advantageous that the diorganopolysiloxanes as Component (A) be in the state of gum. Additionally, a mixture of diorganopolysiloxanes having the same substituent composition but differring in polymerization degree may be used as Component (A).

The component (B) is constituted of at least one organopolysiloxane comprising $R^2{}_3SiO_{0.5}$ units (wherein $R^2$ is an unsubstituted or substituted monovalent hydrocarbon group containing 1 to 10 carbon atoms) and $SiO_2$ units, wherein the mole ratio of $R^2{}_3SiO_{0.5}$ units to $SiO_2$ units (hereinafter abbreviated as "$R^2{}_3SiO_{0.5}/SiO_2$ ratio") is from 0.6 to 1.3. Examples of $R^2$ include an alkyl group such as methyl, ethyl, propyl or butyl group, a cycloalkyl group such as cyclohexyl group, an aryl group such as phenyl or tolyl group, and a group formed by substituting hydroxyl group(s), cyano group(s) or halogen atom(s) for a part or all of carbon-bonded hydrogen atoms in the groups as recited above, such as hydroxypropyl, cyanoethyl, 1-chloropropyl or 3,3,3-trifluoropropyl group. Of these groups, methyl and phenyl groups are especially preferred as $R^2$ groups. The component (B) is a component for imparting pressure sensitive adhesiveness to the present composition, and so the greater the amount of Component (B) used, the stronger the adhesion strength of the composition.

When the organopolysiloxane has a $R^2{}_3SiO_{0.5}/SiO_2$ ratio lower than 0.6 by mole, it tends to provide poor adhesion and tack; while, when the $R^2{}_3SiO_{0.5}/SiO_2$ ratio thereof is higher than 1.3 by mole, it tends to cause a lowering of holding power. The component (B) of the present composition may be a mixture of two or more of organopolysiloxanes meeting the foregoing restrictions. The component (A) and the component (B) may be used as a simple mixture thereof, or as a partially condensed product thereof. The suitable mixing ratio between the component (A) and the component (B) is from 20/80 to 80/20 by weight, particularly from 30/70 to 70/30 by weight.

The component (C), namely organohydrogenpolysiloxane containing at least two silicon-bonded hydrogen atoms per molecule, functions as a cross-linking agent. The organohydrogenpolysiloxane used as Component (C) may have any of straight-chain, branched and cyclic structures. Specifically, it can be represented by any of the following formulae, but these formulae should not be construed as limiting the scope of the organohydrogenpolysiloxanes usable as Component (C) in the invention:

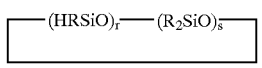

or $(H_bR_{3-b}SiO_{1/2})_w$—$(HRSiO)_x$—$(R_2SiO)_y$—$(RSiO_{3/2})_z$.

In the above formulae, R is the same as R defined in the description of Component (A), and examples thereof include the same groups. Of these groups, methyl and phenyl groups are preferred over the others. In particular, it is advantageous to the invention that at least 50% of all the R groups be methyl groups.

b is an integer of from 0 to 3, r is an integer of at least 2, and s is an integer of at least zero, provided that the sum total of r and s is 3 or above. w, x, y and z are integers of at least 0 and they are chosen to ensure a viscosity of 1 to 50,000 cP at 25° C. in the corresponding organohydrogenpolysiloxane. In addition, b×w+x is required to be at least 2. The suitable viscosity of organohydrogenpolysiloxane as Component (C) is from 10 to 10,000 cP at 25° C. And Component (C) may be a mixture of two or more of the organohydrogenpolysiloxanes as mentioned above. As to the amount of Component (C) used, it is suitable for Component (C) to be mixed with Component (A) so that the molar ratio of SiH groups in Component (C) to alkenyl groups in Component (A) is from 0.5 to 20, particularly from 1 to 15. When the molar ratio is lower than 0.5, the lowering of holding power tends to occur because the density of cross-links formed becomes low; while, when it is higher than 20, the deterioration of adhesion and tack is apt to be caused.

The component (D) is a retarder, and consists of an acetylene alcohol compound represented by the following formula:

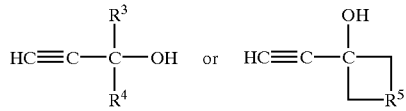

wherein $R^3$ and $R^4$ are each a monovalent hydrocarbon group containing 1 to 8 carbon atoms, with examples including an alkyl group, such as methyl, ethyl, propyl or isobutyl group, and an aryl group such as phenyl group; and $R^5$ is a divalent 3–8C hydrocarbon group, such as propylene, —$(CH_2)_4$— or —$(CH_2)_5$— group. In the former formula, however, it is desirable for the total number of carbon atoms contained in $R^3$ and $R^4$ to be not greater than 8. This is because the total number greater than 8 is act to result in a decrease of curability.

Examples of an acetylene alcohol compound as Component (D) include 3-methyl-1-butyne-3-ol (b.pt. 104° C.), 3-methyl-1-pentyne-3-ol (b.pt. 121° C.), 3,5-dimethyl-1-hexyne-3-ol (b.pt. 150° C.) and 1-ethynylcyclohexanol (b.pt. 180° C.). The Component (D) can achieve the intended effect when it is mixed in an amount of from 0.01 to 0.5 parts by weight per 100 parts by weight of the combination of Component (A) and Component (B). Specifically, when the amount mixed is smaller than 0.01 parts by weight, satisfactory retarding effect cannot be obtained; while the mixing of Component (D) in an amount greater than 0.5 parts by weight causes a drop in curability. In addition, it is suitable for the invention to use as Component (D) an acetylene alcohol compound having a boiling point lower than 170° C.

The component (E) is also a retarder, and consists of an silylated acetylene alcohol compound represented by the following formula:

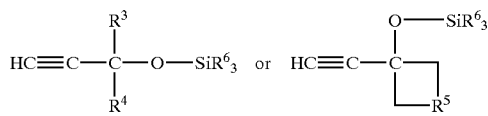

wherein $R^3$, $R^4$ and $R^5$ have the same meanings as those defined respectively in the description of Component (D), and $R^6$ is a monovalent 1–8C hydrocarbon group. Suitable examples of $R^6$ include an alkyl group, such as methyl, ethyl, propyl or isobutyl group, and an aryl group such as, phenyl group.

Examples of a silylated acetylene alcohol compound as Component (E) include 2-methyl-3-butyne-2-oxytrimethylsilane (b.pt. 115° C.), 3-methyl-1-propyne-3-oxytrimethylsilane, 3,5-dimethyl-1-hexyne-3-oxytrimethylsilane, 1-ethynylcyclohexyl-1-oxytrimethylsilane and bis (2-methyl-3-butyne-2-oxy) dimethylsilane (b.pt. 195° C.). The Component (E) can achieve the intended retarding effect when it is mixed in an amount of from 0.1 to 1.0 parts by weight per 100 parts by weight of the combination of component (A) and Component (B). Specifically, when the amount mixed is smaller than 0.1 parts by weight, satisfactory retarding effect cannot be obtained; while, even when the Component (E) is mixed in an amount greater than 1.0 parts by weight, further extension is not added to the available time of the composition. It is advantageous to the invention that the silylated acetylene alcohol compound having a boiling point lower than 170° C. be used as Component (E).

The combined use of Component (D) and component (E) is important to the invention. In a treatment bath containing an addition-reaction silicone pressure sensitive adhesive composition, gelation or a curability decrease is generally caused as the SiH groups of a cross-linking agent are consumed with a lapse of time. In accordance with the invention, on the other hand, proper amounts of Component (D) and Compound (E) are used in combination, and thereby a decrease of SiH content in the cross-linking agent and gelation can be inhibited from occurring in the treatment bath, and besides, satisfactory curability can be ensured in the addition-reaction silicone pressure sensitive adhesive composition.

The action mechanisms of Components (D) and (E) in the treatment bath are as follows: A strong coordinate bond is formed between an acetylene alcohol as Component (D) and a platinum catalyst to lower the activity of the catalyst. Because of lowered activity of the catalyst, although both acetylene group of a silylated acetylene alcohol as Component (E) and alkenyl groups of Component (A) can undergo addition reaction with SiH groups of cross-linking agent as Component (C), the silylated acetylene alcohol higher in reactivity has higher priority in the progress of addition reaction. As a result, the reaction between the alkenyl groups of Component (A) and the SiH groups of Component (C) hardly proceeds, and thereby the available time of the treatment bath is extended.

The acetylene group and the hydroxyl group in Component (D) are bonded to one and the same carbon atom, so that Component (D) is coordinated strongly with a platinum catalyst. On the other hand, Component (E) has a structure that the hydroxyl group of Component (D) is silylated; as a result, its power to coordinate with a platinum catalyst is decreased, and the addition reactivity is increased. Thus, the objects of the invention are attained by making use of the aforementioned distinctions between the two Components (D) and (E) in chemical structure, coordination capabilities with catalysts and addition reactivity.

By contrast, the single use of Component (D) tends to cause gelation in the treatment bath with the lapse of time. Although the gelation can be retarded by increasing the usage of Component (D), deterioration of curability and change in adhesion characteristics are caused, too. On the other hand, the single use of Component (E) tends to cause gelation in the treatment bath with the lapse of time or fail to retard a decrease in SiH content in the treatment bath. While the gelation can be retarded by increasing the usage of Component (E), the decrease in SiH content in the treatment bath cannot be retarded satisfactorily, and deterioration of curability and change in adhesion characteristics are caused, too, Component (F) is a platinum catalyst, and examples thereof include chloroauric acid, an alcohol solution of chloroauric acid, the product of reaction between chloroauric acid and an alcohol, the product of reaction between chloroauric acid and an olefin compound, and the product of reaction between chloroauric acid and a vinyl group-containing siloxane. The suitable proportion of Component (F) to the total amount of Components (A) and (B) is from 1 to 5,000 ppm, particularly preferably from 5 to 2,000 ppm, based on platinum. When the proportion is lower than 1 ppm, it tends to occur that the density of cross-linkages is low to lower the holding power; while, when it is increased beyond 5,000 ppm, decrease in adhesion or tack and reduction In available time are apt to occur.

In addition to the components mentioned above, the present silicone pressure sensitive adhesive composition can contain optional components, such as various solvents, antioxidants and pigments. Examples of solvents usable herein include aromatic solvents such as toluene and xylene, aliphatic solvents such as hexane and octane, ketone solvents such as methyl ethyl ketone and methyl isobutyl ketone, ester solvents such as ethyl acetate and isobutyl acetate, ether solvents such as diisopropyl ether and 1,4-dioxane, and mixtures of two or more of the solvents as recited above.

The present silicone pressure sensitive adhesive composition can be prepared by compounding prescribed amounts of Components (A) to (F) and optional additives. Herein, all the components except Component (F) are mixed first, and then Component (F) is added thereto. The thus compounded silicone pressure sensitive adhesive composition is coated on various substrates, and then cured under prescribed conditions to form adhesive layers.

Examples of a substrate on which the present composition can be coated include plastic films such as polyester, polytetrafluoroethylene, polyimide and polyphenylene sulfide films, metal foils such as aluminum and copper foils, paper such as Japanese paper and synthetic paper, cloth, glass fiber, and compound substrates formed from two or more of the substrates as recited above.

The present composition is generally coated in a layer having a thickness of 1 to 200 $\mu$m, and cured at a temperature of 100 to 200° C. over a period of 30 seconds to 15 minutes. However, these conditions should be understood not to limit the scope of the invention in any way.

The entire disclosure of all applications, patents and publications, cited above and below, and of corresponding Japanese application No. 11-268603, filed Sep. 22, 1999, is hereby incorporated by reference.

Now, the present invention is illustrated in more detail by reference to the following examples. However, the invention should not be construed as being limited to these examples. Additionally, all "parts" and all "%" used hereinafter are by weight.

The characteristic values are determined by the following testing methods.

Proportion of Remaining SiH Content:

After a 40% toluene solution of silicone pressure sensitive adhesive composition is allowed to stand at 35° C. for a prescribed period of time, a fixed portion of the resulting solution is put in a vial and weighed precisely. Thereto, an alcohol-saturated solution of potassium hydroxide is added, and then the vial is hermetically sealed. After a thorough shake, the hydrogen gas thus evolved is analyzed by head-space gas chromatography to determine the quantity of hydrogen gas evolved from the fixed weight of a silicone pressure sensitive adhesive composition. Based on the thus determined value, the proportion of remaining SiH content to original SiH content in each sample is calculated in % by weight.

Adhesion:

A 40% toluene solution of silicone pressure sensitive adhesive composition is allowed to stand at a prescribed temperature for a prescribed period of time, then coated on a polyester film having a thickness of 25 $\mu$m and a width of 25 mm so as to have a thickness of 30 μm after curing, and further cured by one-minute heating at 130° C., thereby preparing an adhesive tape. The thus prepared tape is applied to a stainless plate (SUS304), and stuck thereto under the pressure applied by a round trip of a rubber-coated roller having a weight of 2 kg. After standing at room temperature for about 20 hours, the adhesive tape is peeled apart from the stainless plate by using a tensile tester under a condition that the peeling speed is 300 mm/min and the peeling angle is 180 degrees, arid the force required therefor (gf/25 mm) is measured.

Holding Power:

Sample pieces are prepared in the same manner as those for measurement of ahesion. Each of the thus prepared adhesive tapes is applied to a stainless plate so as to have an adhering area measuring 25 mm×25 mm, and a load weighing 1 kg is imposed on the lower end thereof, followed by standing for 2 hours at 150° C. Then, the displacement distance of the adhesive tape is read under a microscope.

EXAMPLE 1

In a four-necked flask equipped with a stirrer, a thermometer, an ester adapter and a reflux condenser were placed 65 parts of toluene, 100 parts of diorganopolysiloxanes containing alkenyl groups (specifically, dimethylpolysiloxane blocked with dimethylvinylsiloxane at both ends, having a vinyl content of 0.001 mol/100 g) and 300 parts of a 60% toluene solution of organopolysiloxanes comprising $Me_3SiO_{1/2}$ units and $SiO_{4/2}$ units in a $Me_3SiO_{1/2}/SiO_{4/2}$ ratio of 1.1 (wherein Me stands for methyl group). The resulting mixture was refluxed at 110° C. for 6 hours to under go condensation reaction. Then, the reaction mixture was allowed to stand till the temperature thereof fell to 30° C.

Further thereto, 0.6 parts of organohydrogenpolysiloxane represented by $Me_3SiO—(HMeSiO)_{38}—SiMe_3$ was added (wherein the ratio of the SiH groups from the organohydrogenpolysiloxane used to the alkenyl groups from the alkenyl groups-containing diorganopolysiloxanes used was 9.3 by mole), and then toluene was added so that the nonvolatile component had a concentration of 40%, followed by stirring to make a homogeneous mixture. Then, 3,5-dimethyl-1-hexyne-3-ol and 2-methyl-3-butyne-2-oxytrimethylsilane were added to the foregoing homogeneous mixture in such amounts that their proportions to the total weight of the alkenyl groups-containing diorganopolysiloxanes and the organopolysiloxanes constituted of $Me_3SiO_{1/2}$ units and $SiO_{4/2}$ units were 0.03% and 0.25% respectively, and mixed homogeneously.

Furthermore, a platinum catalyst containing 0.5% of platinum element was added in a proportion of 0.8% to the total weight of the alkenyl groups-containing diorganopolysiloxanes and the organopolysiloxanes constituted of $Me_3SiO_{4/2}$ units and $SiO_{4/2}$ units, and mixed homogeneously in the foregoing mixture to prepare a solution of silicone pressure sensitive adhesive composition. The thus prepared treatment bath was examined for proportion of remaining SiH content, adhesion and holding power just after it was prepared and after it was allowed to stand at 35° C. over fixed periods of time. The results obtained are shown in Table 1.

EXAMPLE 2

A solution of silicone pressure sensitive adhesive composition was prepared in the same manner as in Example 1, except that the proportion of 3,5-dimethyl-1-hexyne-3-ol added was changed to 0.3%. The thus prepared treatment bath was examined for proportion of remaining SiH content, adhesion and holding power just after it was prepared and after it was allowed to stand at 35° C. over a fixed period of time. The results obtained are shown in Table 1.

EXAMPLE 3

A solution of silicone pressure sensitive adhesive composition was prepared in the same manner as in Example 1, except that 3-methyl-1-butyne-3-ol was used in a proportion of 0.03% in place of 3,5-dimethyl-1-hexyne-3-ol. The thus prepared treatment bath was examined for proportion of remaining SiH content, adhesion and holding power just after it was prepared and after it was allowed to stand at 35° C. over a fixed period of time. The results obtained are shown in Table 1.

COMPARATIVE EXAMPLE 1

A solution of silicone pressure sensitive adhesive composition was prepared in the same manner as in Example 1, except that 2-methyl-3-butyne-2-oxytrimethylsilane was not added at all. The thus prepared treatment bath was examined for proportion of remaining SiH content, adhesion and holding power just after it was prepared and after it was allowed to stand at 35° C. over a fixed period of time. The results obtained are shown in Table 1.

COMPARATIVE EXAMPLE 2

A solution of silicone pressure sensitive adhesive composition was prepared in the same manner as in Example 1, except that 2-methyl-3-butyne-2-oxytrimethylsilane was not added at all and the proportion of 3,5-dimethyl-1-hexyne-3-ol added was changed to 0.3%. The thus prepared treatment bath was examined for proportion of remaining SiH content, adhesion and holding power just after it was prepared and after it was allowed to stand at 35° C. over a fixed period of time. The results obtained are shown in Table 1.

COMPARATIVE EXAMPLE 3

A solution of silicone pressure sensitive adhesive composition was prepared in the same manner as in Example 1, except that 3,5-dimethyl-1-hexyne-3-ol was not added at all. The thus prepared treatment bath was examined for proportion of remaining SiH content, adhesion and holding power just after it was prepared and after it was allowed to stand at 35° C. over fixed periods of time. The results obtained are shown in Table 1.

COMPARATIVE EXAMPLE 4

A solution of silicone pressure sensitive adhesive composition was prepared in the same manner as in Example 1, except that 3,5-dimethyl-1-hexyne-3-ol was not added at all and the proportion of 2-methyl-3-butyne-2-oxytrimethylsilane added was changed to 1.0%. The thus prepared treatment bath was examined for proportion of remaining SiR content, adhesion and holding power just after it was prepared and after it was allowed to stand at 35° C. over fixed periods of time. The results obtained are shown in Table 1.

TABLE 1

|  | Proportion of Controlling agent added* (%) | | | Time (h) | Proportion of remaining SiH content | Adhesion (g/25 mm) | Holding Power (mm) |
| --- | --- | --- | --- | --- | --- | --- | --- |
|  | 3.5-dimethyl-1-hexyne-3-ol | 3.5-methyl-1-butyne-3-ol | 2-methyl-3-butyne-2-oxy-trimethylsilane | | | | |
| Example 1 | 0.03 | 0 | 0.25 | 0 | 100 | 1270 | 0.02 |
|  |  |  |  | 6 | 93 | 1250 | 0.03 |
|  |  |  |  | 24 | 69 | 1270 | 0.02 |
| Example 2 | 0.3 | 0 | 0.25 | 0 | 100 | 1260 | 0.02 |
|  |  |  |  | 24 | 91 | 1260 | 0.02 |
| Example 3 | 0 | 0.03 | 0.25 | 0 | 100 | 1260 | 0.03 |
|  |  |  |  | 24 | 76 | 1270 | 0.02 |
| Compar. Ex. 1 | 0.03 | 0 | 0 | 0 | 100 | 1250 | 0.03 |
|  |  |  |  | 24 | Treatment solution gelled | | |
| Compar. Ex. 2 | 0.3 | 0 | 0 | 0 | 100 | 1280 | 0.03 |
|  |  |  |  | 24 | Treatment solution gelled | | |
| Compar. Ex. 3 | 0 | 0 | 0.25 | 0 | 100 | 1270 | 0.02 |
|  |  |  |  | 6 | 39 | 1290 | 0.02 |
|  |  |  |  | 24 | Treatment solution gelled | | |
| Compar. Ex. 4 | 0 | 0 | 1.0 | 0 | 100 | 1270 | 0.02 |
|  |  |  |  | 6 | 69 | 1280 | 0.03 |
|  |  |  |  | 24 | 18 | 1510 | slipped off |

*Proportion (expressed in weight %) to the total weight of alkenyl groups-containing diorganopolysilxanes and organopolysiloxanes constituted of $Me_3SiO_{0.5}$ and $SiO_2$.

Proportion (expressed in weight %) to the total weight of alkenyl groups-containing diorganopolysiloxanes and organopolysiloxanes constituted of $Me_3SiO_{0.5}$ and $SiO_2$.

As can be seen from Table 1, the compositions according to the invention were successful in retarding a decrease of SiH content in the cross-linking agent, and thereby the treatment baths comprising the present compositions was able to have an elongated available time.

Without further elaboration, it is believed that one skilled in the art can, using the preceding description, utilize the present invention to its fullest extent. The above preferred specific embodiments are, therefore, to be construed as merely illustrative, and not limitative of the remainder of the disclosure in any way whatsoever.

In the foregoing and in the preceding examples, all temperatures are set forth uncorrected in degrees Celsius; and, unless otherwise indicated, all parts and percentages are by weight.

The entire disclosure of all applications, patents and publications, cited above, and of corresponding Japanese application No. 268603/99, filed Sep. 22, 1999, is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An addition-reaction silicone pressure sensitive adhesive composition comprising the following components (A) to (F):
   (A) diorganopolysiloxanes containing alkenyl groups the number of which is on average at least two a molecule,
   (B) an organopolysiloxane comprising $R^2_3SiO_{0.5}$ units and $SiO_2$ units in a $R^2_3SiO_{0.5}/SiO_2$ ratio of from 0.6 to 1.3 by mole wherein $R^2$ is an unsubstituted or substituted monovalent hydrocarbon group containing 1 to 10 carbon atoms,
   (C) an organohydrogenpolysiloxane containing at least two per molecule of silicon-bonded hydrogen atoms,
   (D) an acetylene alcohol compound represented by the following formula

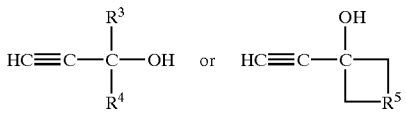

wherein $R^3$ and $R^4$ are each a monovalent hydrocarbon group containing 1 to 8 carbon atoms and $R^5$ is a divalent hydrocarbon group containing 3 to 8 carbon atoms,
   (E) a silylated acetylene alcohol compound represented by the following formula

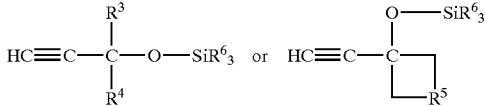

wherein $R^3$, $R^4$ and $R^6$ are each a monovalent hydrocarbon group containing 1 to 8 carbon atoms and $R^5$ is a divalent hydrocarbon group containing 3 to 8 carbon atoms, and
   (F) a platinum catalyst.

2. An addition-reaction silicone pressure sensitive adhesive composition according to claim 1, wherein the component (A) and the component (B) are comprised in a ratio of from 20/80 to 80/20 by weight.

3. An addition-reaction silicone pressure sensitive adhesive composition according to claim 1, wherein the component (C) is comprised in an amount that the molar ratio of SiH groups in the component (C) to alkenyl groups in the component (A) is from 0.5 to 20.

4. An addition-reaction silicone pressure sensitive adhesive composition according to claim 1, wherein the component (D) is comprised in an amount of from 0.01 to 0.5 parts by weight per 100 parts by weight of the combination of the components (A) and (B).

5. An addition-reaction silicone pressure sensitive adhesive composition according to claim 1, wherein the component (E) is comprised in an amount of from 0.1 to 1.0 parts by weight per 100 parts by weight of the combination of the components (A) and (B).

6. An addition-reaction silicone pressure sensitive adhesive composition according to claim 1, wherein the component (F) is comprised in a proportion of 1 to 5,000 ppm to the total amount of the components (A) and (B).

7. An addition-reaction silicone pressure sensitive adhesive composition according to claim 1, wherein the component (D) is an acetylene alcohol compound selected from the group consisting of 3-methyl-1-butyne-3-ol, 3-methyl-1-pentyne-3-ol, 3,5-dimethyl-1-hexyne-3-ol and 1-ethynylcyclohexanol.

8. An addition-reaction silicone pressure sensitive adhesive composition according to claim 1, wherein the component (F) is a silylated acetylene alcohol compound selected from the group consisting of 2-methyl-3-butyne-2-oxytrimethylsilane, 3-methyl-1-propyne-3-oxytrimethylsilane, 3,5-dimethyl-1-hexyne-3-oxytrimethylsilane, 1-ethynyl-cyclohexyl-1-oxytrimethylsilane and bis (2-methyl-3-butyne-2-oxy) dimethylsilane.

9. An addition-reaction silicone pressure sensitive adhesive composition according to claim 1, wherein $R^2$ is an alkyl or aryl group comprising up to 10 carbon atoms.

10. An addition-reaction silicone pressure sensitive adhesive composition according to claim 1, wherein said composition cures at a temperature of 100–200° C. over a period of 30 seconds–15 minutes.

11. An addition-reaction silicone pressure sensitive adhesive composition according to claim 1, wherein the component (F) is comprised in a proportion of 5–2,000 ppm to the total amount of the components (A) and (B).

12. A layer having a thickness of 1–200 μm comprising an addition-reaction silicone pressure sensitive adhesive composition according to claim 1.

13. An addition-reaction silicone pressure sensitive adhesive composition according to claim 1, wherein the component (C) is comprised in an amount that the molar ratio of SiH groups in the component (C) to alkenyl groups in the component (A) is 1–15.

14. An addition-reaction silicone pressure sensitive adhesive composition according to claim 1, wherein the component (A) and the component (B) are comprised in a ratio of 30/70–70/30 by weight.

15. An addition-reaction silicone pressure sensitive adhesive composition consisting essentially of the following components (A) to (F):

(A) diorganopolysiloxanes containing alkenyl groups the number of which is on average at least two a molecule,
(B) an organopolysiloxane comprising $R^2_3SiO_{0.5}$ units and $SiO_2$ units in a $R^2_3SiO_{0.5}/SiO_2$ ratio of 0.6–1.3 by mole wherein $R^2$ is an unsubstituted or substituted monovalent hydrocarbon group comprising 1–10 carbon atoms,
(C) an organohydrogenpolysiloxane containing at least two per molecule of silicon-bonded hydrogen atoms,
(D) an acetylene alcohol compound represented by the following formula

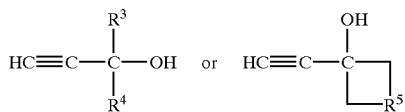

wherein $R^3$ and $R^4$ are each a monovalent hydrocarbon group comprising 1–8 carbon atoms and $R^5$ is a divalent hydrocarbon group comprising 3–8 carbon atoms,
(E) a silylated acetylene alcohol compound represented by the following formula

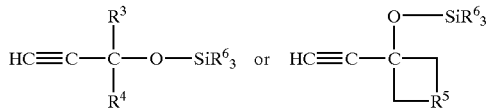

wherein $R^3$, $R^4$ and $R^6$ are each a monovalent hydrocarbon group comprising 1–8 carbon atoms and $R^5$ is a divalent hydrocarbon group comprising 3–8 carbon atoms, and
(F) a platinum catalyst.

16. An addition-reaction silicone pressure sensitive adhesive composition consisting of the following components (A) to (F):

(A) diorganopolysiloxanes containing alkenyl groups the number of which is on average at least two a molecule,
(B) an organopolysiloxane comprising $R^2_3SiO_{0.5}$ units and $SiO_2$ units in a $R^2_3SiO_{0.5}/SiO_2$ ratio of 0.6–1.3 by mole wherein $R^2$ is an unsubstituted or substituted monovalent hydrocarbon group comprising 1–10 carbon atoms,
(C) an organohydrogenpolysiloxane containing at least two per molecule of silicon-bonded hydrogen atoms,
(D) an acetylene alcohol compound represented by the following formula

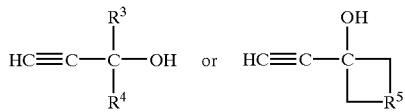

wherein $R^3$ and $R^4$ are each a monovalent hydrocarbon group comprising 1–8 carbon atoms and $R^5$ is a divalent hydrocarbon group comprising 3–8 carbon atoms,
(E) a silylated acetylene alcohol compound represented by the following formula

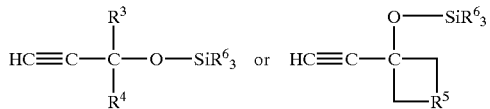

wherein $R^3$, $R^4$ and $R^6$ are each a monovalent hydrocarbon group comprising 1–8 carbon atoms and $R^5$ is a divalent hydrocarbon group comprising 3–8 carbon atoms, and
(F) a platinum catalyst.

* * * * *